Jan. 12, 1971   T. D. READER   3,554,669
ELECTRICFLUID ENERGY CONVERTER
Filed Dec. 4, 1968   2 Sheets-Sheet 1

INVENTOR:
TREVOR D. READER,
BY *Hillea & Becker*
AGENT

Jan. 12, 1971  T. D. READER  3,554,669
ELECTRICFLUID ENERGY CONVERTER
Filed Dec. 4, 1968  2 Sheets-Sheet 2

INVENTOR:
TREVOR D. READER.
BY
AGENT

United States Patent Office 3,554,669
Patented Jan. 12, 1971

3,554,669
ELECTRIC-FLUID ENERGY CONVERTER
Trevor D. Reader, King of Prussia, Pa., assignor to General Electric Company, a corporation of New York
Filed Dec. 4, 1968, Ser. No. 781,180
Int. Cl. F04b 37/02; F04f 11/00
U.S. Cl. 417—48
12 Claims

ABSTRACT OF THE DISCLOSURE

A flueric device for converting electrical energy into fluid energy and vice versa. The basic device is of a laminate structure comprised of two electrically conductive, channelled electrode members, an emitter and a receiver, which are spaced a given distance from each other and joined between layers of electrically insulating material. The channels of the emitter and receiver are aligned so as to form a flow passage through the device. A direct current electric power supply is impressed between the emitter and receiver to cause a flow of ions from the emitter to the receiver which causes fluid to be pulled from an inlet through the channels of the emitter and receiver and out an exit of the device.

ELECTRIC-FLUID ENERGY CONVERTER

Background of the invention

The subject invention basically concerns means for converting electrical energy into fluid energy, and, in particular, to a flueric electric-fluidic energy conversion device.

Ion pumps which use electrical energy to cause a fluid flow are well known in the art. However, prior art ion pumps have generally been quite inefficient, difficult to manufacture, noisy and somewhat hazardous for consumer use, because of the high voltages normally required. Ion pumps are potentially useful in a great many areas as they may be used to provide a variety of functions such as signal converting in equipment such as those utilizing fluidic devices, cooling or ventilating.

Summary of the invention

Accordingly, it is an object of the subject invention to provide an electric-fluid energy converter having a high efficiency.

Another object of the said invention is to provide an electric-fluid energy converter which is cheap and simple to manufacture with critical dimensions at small tolerances and which is quiet in operation.

Yet another object is to provide a safe converter which does not depend on high voltages for its operation.

Still another object of the subject invention is to provide an electric-fluid energy converter which is directly compatible with fluidic devices.

To fulfill the above-stated objects the subject invention provides a flueric electric-fluid energy converter having a laminate structure. Each device consists of two electrodes, an emitter and a receiver. Each electrode is formed of a channelled, electrically conductive member with the channels of the receiver generally aligned with the channels of the emitter to allow fluid flow therethrough and the emitter being spaced a given distance from receiver. The emitter and receiver are bonded between layers of insulating material to complete the structure.

In operation, the emitter and receiver are connected to opposite terminals of a DC electric power supply, preferably the emitter being connected to the negative terminal. In this preferred embodiment excess electrons at the downstream end of the emitter attach themselves to molecules of a fluid and produce ions which are attracted toward the receiver which is of the opposite polarity. In this way the device causes motion of the gas ions which in turn hit other gas molecules and cause a "wind" to be created within the device. This causes a rise in pressure of the incoming fluid which is then exhausted through an outlet.

The subject matter which is regarded as the present invention is particularly pointed out and distinctly claimed in the concluding portion of the specification.

BRIEF DESCRIPTION OF THE DRAWINGS

The subject invention, however, together with further objects and advantages thereof may best be understood by reference to the following description taken in connection with the accompanying drawings in which.

DESCRIPTION OF THE PREFERRED EMBODIMENTS

Figure 1:
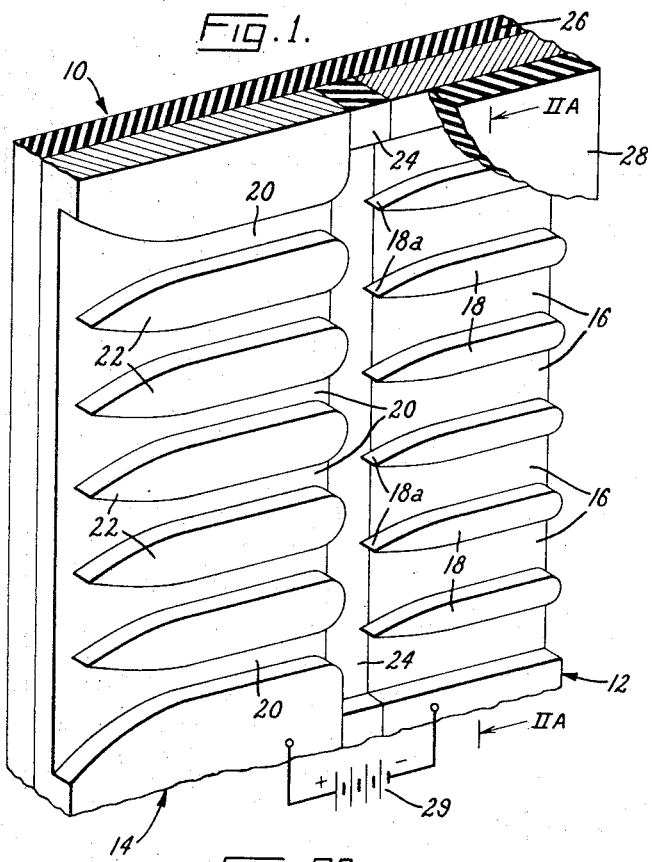
FIG. 1 is a perspective view of an ionic pump embodying the subject invention.
Figure 2A:
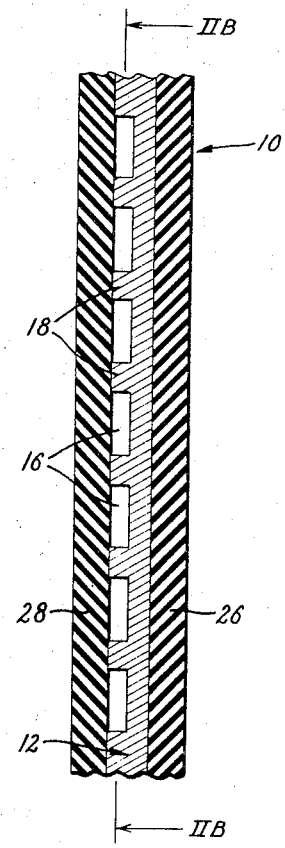
FIG. 2A is an end sectional view of the device shown in FIG. 1 taken along the line denoted IIA—IIA.
Figure 2B:
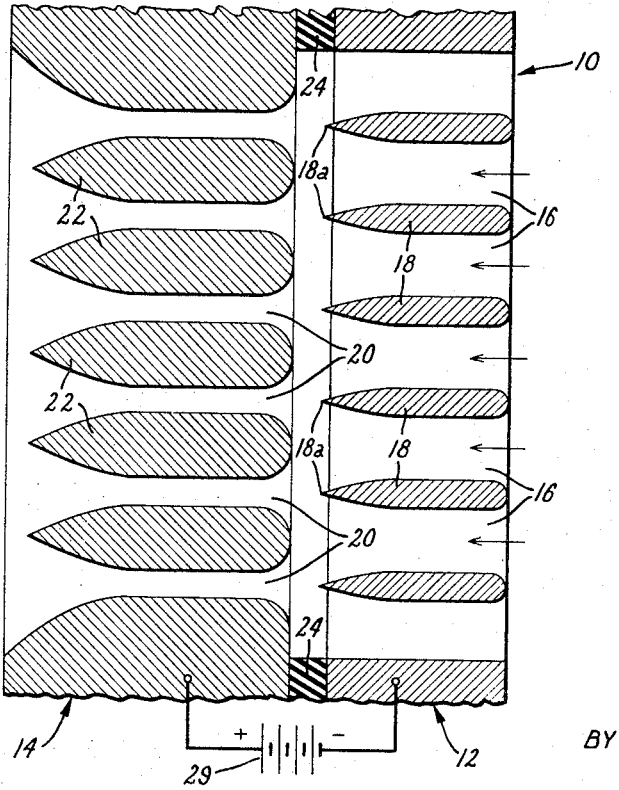
FIG. 2B is a longitudinal section view of the device shown in FIG. 2A taken along the line denoted IIB—IIB.

In FIGS. 1, 2A and 2B the basic embodiment of an electric-fluid energy converter in the form of an ionic pump 10 in accordance with the subject invention is shown. The device is basically formed of two electrode members, an emitter 12 and a receiver 14. The emitter 12 is formed of a flat electrically conductive plate having a plurality of channels 16 located therein. Projections 18 formed between the channels 16 are tapered to form sharp tips 18a at their downstream end which may overhang slightly, the direction of fluid flow being indicated by the arrows shown within the channel 16.

The receiver 14 is similarly formed of an electrically conductive plate having channels 20 therein which define elongated projections 22 therebetween. The channels 16, 20 of the electrodes are somewhat aligned so as to form through passageways within the pump 10. The emitter 12 and the receiver 14 are spaced from each other by a spacer 24 of electrically insulating material.

By using this type of structure the parts of the device can be easily and inexpensively manufactured, the dimensional relationships between the parts can be accurately maintained and the size of the entire device can be quite small. The emitter 12, receiver 14 and spacer 24 are all bonded between two sheets 26, 28 of electrically insulating material as best shown in FIG. 2A.

For operation, the emitter 12 and receiver 14 are connected to opposite terminals of a DC electric power supply 29. As shown in FIG. 1, the emitter 12 is connected to the negative terminal and the receiver 14 to the positive terminal. At the downstream end of the emitter 12, the sharp tips 18a serve to easily allow excess electrons to flow therefrom and attach themselves to molecules of the fluid within the device to form ions. As the receiver 14 is of the opposite polarity, i.e. positive, the ions are attracted toward the receiver 14. The electrons then attach themselves to the receiver 14. After the electrons are attached to the receiver, the attracted ions become uncharged molecules again and the fluid molecules continue translating through the channels 20 within the receiver 14. These ions also cause motion of uncharged fluid molecules between the emitter and receiver by collisions therewith. In this manner a fluid flow, "wind," is created by the flow of electrons thereby causing a pressure rise of the fluid flowing through the device. The existing fluid can then be directed and used for any desired purpose such as cooling or ventilating.

The fluid flow through the device can be controlled by the voltage drop from across the emitter and receiver. There is a maximum voltage that which can be used in the present invention. If the voltage is too high, arcing will occur across the gap between the emitter and receiver and virtually no pumping action will occur. From an efficiency and safety standpoint it is highly desirable that the distance between the emitter points 18a and the receiver 14 be quite small. The smaller the emitter to collector distance, the smaller is the minimum voltage requirement to obtain a unidirectional ion flow. Of importance is the fact that the smaller the emitter to receiver distance, the more the flow tends to be laminar. If the flow is close to pure laminar there will be less fluid energy losses due to turbulence and hence greater efficiency of the device. Also, if the dimensions are such as to produce laminar flow, the device will operate extremely quietly. It is desirable that the emitter to receiver distance is in the range of .0002–.0400 inch and the depth of the receiver channels is in the range of .0005–.0100 inch. The width of the emitter and receiver channels is preferably in the range of .001–.010 inch and the length of the channels is preferably .050–.100 inch.

The structure, in accordance with the subject invention, is particularly adaptable to be dimension within the above-mentioned ranges with a reasonable degree of accuracy and reliability. Channels in both the emitter 12 and receiver 14 are preferably electro-chemically etched from a sheet of material utilizing processes well known in the art. Formation of the emitter tips 18a is by etching away from both sides of the ends of the emitter projections 18. The material to be etched may be of a solid or laminated electrically conductive material or may be coated after etching with a suitably conductive material.

Of course, many modifications may be made to this basic structure, for example the channels of either the emitter or receiver or both may be curved, may be of a non-uniform cross-sectional area, or the plates forming the emitter and receiver may be curved or of any other suitable shape (for example—cylindrical).

Figure 3:
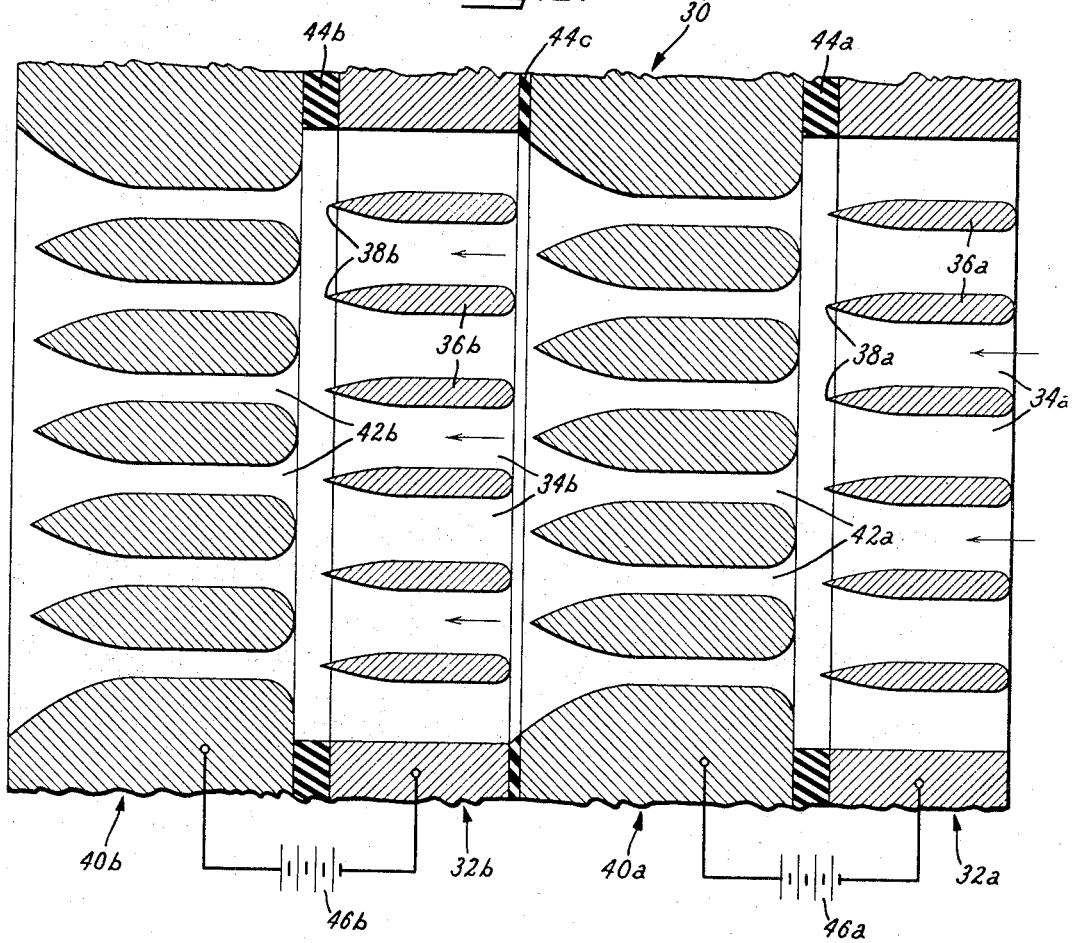
FIG. 3 is a longitudinal section of two ionic pumps connected in series.
Figure 4:
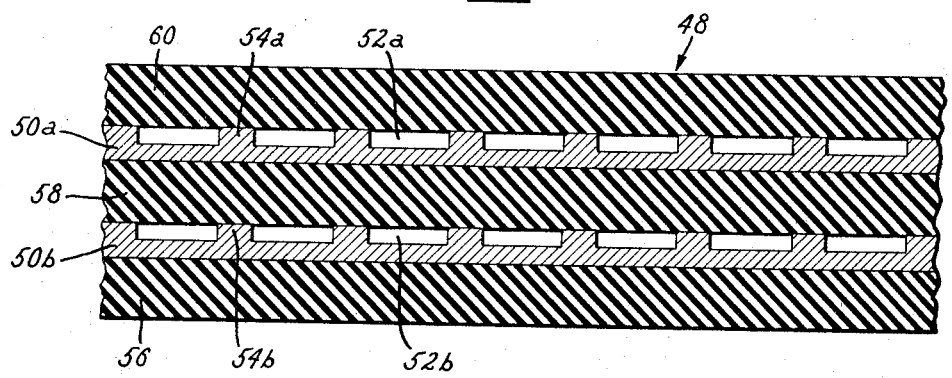
FIG. 4 is a cross-sectional view of two ionic pumps connected in parallel.

If a greater flow or pressure is desired, the devices may be used in series or parallel, as shown in FIGS. 3 and 4.

In FIG. 3 two ionic pump devices similar to the invention of FIGS. 1, 2A and 2B are shown connected in series to form a two-stage pump 30 so as to increase the pressure of the fluid pumped therethrough. The corresponding parts of each of the two stages in FIG. 3 are similar and are denoted by the same reference number with either an $a$ or $b$ suffix.

Each stage is formed of an emitter 32a, b having a plurality of channels 34a, b therein with projections 36a, b between the channels. The downstream end of each of the projections 36a, b is tapered to a fine point 38a,b to more readily facilitate the flow of electrons therefrom to form ions. Downstream of each of the emitters 32a, b and spaced therefrom is a receiver 40a, b having channels 42a, b therein substantially aligned with the emitter channels 34a, b to form through passageways.

An electrically insulated spacer 44a, b and c is provided between each of the emitters 32a, b and the receivers 40a, b and between the first receiver 40a and the second emitter 32b to prevent electrical conduction therebetween as well as maintain the proper spacing. The emitters, receivers, and spacers are all bonded between two insulating plates to form a compact laminated structure.

Each of the emitters 32a, b is connected to a source of negative electrical potential and each of the receivers 40a, b is connected to a source of positive electrical potential as shown by the DC electrical power supplies 46a, b. Of course, one power supply can be used, if desired.

Each stage of the two-stage ionic pump 30 shown in FIG. 3 works in exactly the same manner as that described with respect to FIGS. 1, 2A, and 2B resulting in a greater pressure rise across the two-stage pump 30 than across a one-stage pump as the pressure rise across each of the two stages is cumulative.

If a greater flow rate is desired, the ionic pumps can be arranged in a parallel manner. The parallel pump arrangement, as shown in FIG. 4, consists of two or more ionic pumps similar to that shown in FIGS. 1, 2A and 2B one on top of the other, or alongside the other connected to a common fluid source, in this case the open air.

In FIG. 4 the two emitters 50a, 50b are shown with channels 52a, 52b forming projections 54a, 54b between the channels 52a, 52b. The receivers and spacers (not shown) are likewise formed in a similar relationship. In this configuration three plates 56, 58, 60 are used to enclose and insulate the emitters and receivers. Each emitter and receiver set is connected to a suitable separate or common DC electric power supply and operates in the same manner as that disclosed in regard to the embodiment shown in FIGS. 1, 2A and 2B. The net flow rate is equal to the sum of the flow rates through each emitter-receiver set.

If desired, for any of the embodiments the electrical polarity of the emitters and receivers can be reversed with the emitter being connected to the positive terminal of the DC power source to act as an emitter of holes and the receiver to the negative terminal of the DC power source. In that case, the emitter will absorb electrons thereby creating positive ions which are attracted and propelled toward the receivers of opposite polarity (i.e. negative). The "wind" created thereby causes motion of the fluid molecules from the emitter toward the receiver and out the receiver channels.

The apparatus of the subject invention can also be used in an inverse manner to change fluid energy to electrical energy. For the inverse operation, before the fluid enters the energy conversion device it is passed through an electron-emitting cathode thereby injecting electrons into the flowing stream of fluid. If an electrical load is connected between the two electrode members, as the fluid, including the electrons, flows through one electrode member toward the other electrode member, an electrical current will be caused to flow through the load. This electric current, by definition, flows in the direction opposite the flow of electrons. It is obvious that any parallel or series combination of these devices may be used.

The subject invention is particularly useful for private home or commercial air conditioning systems or as a blower to cool temperature sensitive equipment such as hi-fi or other electrical equipment where the small size, quietness, and safety of the device would be particularly advantageous. Another potential use is in connection with fluidic devices. The similar laminated construction and small size allows such a device to be readily compatible with fluidic devices where it could operate as a signal converter or as an electro-fluidic amplifier. Using the subject invention, an electrical signal can be directly converted into a fluid signal or vice versa, or, if desired, an electrical signal could be used to amplify a pre-existing fluid signal.

Thus it is obvious that many modifications may be made to the subject invention without departing from the scope thereof. Therefore, the scope of the present invention is to be limited only with respect to the appended claims.

I claim:
1. An electric-fluid energy converter comprised of:
 (a) at least two electrode members, each electrode member including a set of spaced projecting portions forming a plurality of channels therebetween;
 (b) channels of one of said electrode members being substantially aligned with the channels of the other said electrode member together forming a plurality of fluid passageways through said converter and said one electrode member being spaced from the other of said electrode members; and (c) a pair of electrically insulating members forming with said electrode members a laminated structure, one of said insulating members contacting said projecting portions of said electrode members to form a covering wall for the channels.

2. A converter as in claim 1 wherein said one electrode member is an emitter and said other electrode member is a receiver and said converter further includes a DC electric power source having one terminal thereof connected to said emitter and other terminal thereof connected to said receiver.

3. A converter as in claim 2 wherein the negative terminal of said electric power source is connected to said emitter and the positive terminal of said electric power source is connected to said receiver and the downstream ends of the spaced projecting portions of said emitter are each tapered to a sharp point.

4. A converter as in claim 1 wherein the spacing between said two electrode members is substantially in the range of .0002–.0400 inch.

5. A converter as in claim 4 wherein the depth of said channels of one of said electrode members is in the range of .0005–.0100 inch.

6. A converter as in claim 1 wherein said electrode members are each formed from an electro-etched base material.

7. A converter as in claim 2 further including a second emitter including a set of spaced projecting portions forming a plurality of channels therebetween; and a second receiver including a set of spaced projecting portions spaced downstream from said second emitter and forming a plurality of channels therebetween which in conjunction with said second emitter channels form a plurality of through fluid passageways; wherein said first mentioned emitter and receiver are located in parallel relationship with said second emitter and receiver, said first and second emitters being connected to a common fluid source.

8. A converter as in claim 7 wherein said electrode members are each formed from an electro-etched base material.

9. A converter as in claim 8 wherein the spacing between each emitter and receiver is substantially in the range of .0002–.0400 inch.

10. A converter as in claim 2 further including a second emitter including a set of spaced projecting portions each having a relatively sharp tip at the downstream end thereof and forming a plurality of channels therebetween; and a second receiver including a set of spaced projecting portions spaced downstream from said second emitter and forming a plurality of channels therebetween which in conjunction with said second emitter channels form a plurality of through fluid passageways; wherein said first mentioned emitter and receiver are located in series relationship with said second emitter and receiver, the downstream end of said channels of said first receiver being in fluid communication with the upstream end of said channels of said second emitter.

11. A converter as in claim 10 wherein said electrode members are each formed from an electro-etched base material.

12. A converter as in claim 11 wherein the spacing between each emitter and receiver is substantially in the range of .0002–.0400 inch.

References Cited

UNITED STATES PATENTS

| | | | |
|---|---|---|---|
| 2,727,859 | 12/1955 | Freeborn | 103—1X |
| 3,071,705 | 1/1963 | Coleman et al. | 230—1 |
| 3,135,208 | 6/1964 | Steutzer | 103—1X |
| 3,212,442 | 10/1965 | Jorgenson et al. | 103—1 |
| 3,348,487 | 10/1967 | Miller | 103—1 |
| 3,427,978 | 2/1969 | Hanneman et al. | 103—1 |

WILLIAM L. FREEH, Primary Examiner

U.S. Cl. X.R.

310—11